Nov. 26, 1940.    R. A. MILLER    2,223,118
ABSORPTIVE GLASS
Filed March 25, 1938
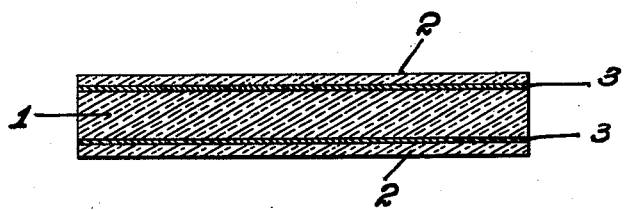
INVENTOR.
ROBERT A. MILLER
BY Bradley & Bee
ATTORNEYS.

Patented Nov. 26, 1940

2,223,118

UNITED STATES PATENT OFFICE 2,223,118

ABSORPTIVE GLASS

Robert A. Miller, Tarentum, Pa., assignor to Pittsburgh Plate Glass Company, Allegheny County, Pa., a corporation of Pennsylvania Application March 25, 1938, Serial No. 198,044

2 Claims. (Cl. 250—108)

The invention relates to absorptive glass, that is, glass having the property of absorbing or interrupting the shorter actinic rays, such as ultraviolet rays and X-rays. Such glass is used as a protection from X-ray machines, for covering documents to prevent fading of the ink, and for glazing work where protection of valuable fabrics from fading is necessary. The most effective of these protective glasses is lead glass which is used exclusively for X-ray work and in most cases for the protection of documents. One serious objection to this glass, not heretofore overcome, is the tendency of the glass to weather and tarnish and lose its transparency due to abrasion in cleaning, as the glass is soft and subject to reaction with certain elements in the atmosphere. The present invention is designed to overcome this difficulty, not only with ordinary lead glass, but also with other glasses having high ultraviolet and X-ray cut-off properties, such as the lead glasses having a barium content, which are subject to the same difficulty as to weathering and tarnishing. Briefly stated, this result is accomplished by cementing to each face of the sheet of absorptive glass a thin sheet of non-absorptive glass having good weathering qualities. The most suitable glass for this surface protection of the faces of the absorptive sheet is ordinary window glass of the thickness known as photo glass. This is a lime soda glass with a high silica content which is hard and strong. Such glass will not tarnish or weather and, because of its hardness, is not subject to a loss of transparency, due to an impairment of its polish, as a result of the abrasion incident to repeated cleaning. A plate of the improved glass is shown in the accompanying drawing, wherein:

The figure is a section through the plate with the thickness of the layers somewhat exaggerated for clearness of illustration.

Referring to the drawing, the central sheet 1 is of absorptive glass, such as lead glass, and 2, 2 are sheets of lime soda glass, such as photo glass. This photo glass is between a sixteenth and a thirty-second of an inch in thickness, and the sheets are secured together by the layers 3, 3 of a suitable cement, not subject to discoloration by exposure to light, such as vinyl acetal resin. Aside from the protection from weathering due to the sheets 2, 2, the use of such sheets and of the cement layers 3, 3, add materially to the strength of the sheet, thus reducing the danger of breakage in handling and in service. When the plate is used for glazing windows or for the protection of documents, the sheet 1 will ordinarily be of quarter inch glass, while in X-ray work this thickness may be as great as an inch or even more.

The use of a drawn glass, such as the photo glass, is preferred for the facing sheets 2, 2, as opposed to ground and polished plate glass, since it is difficult to produce ground and polished sheets of the desired thinness, and the photo glass is considerably stronger than plate glass of the same thickness, as the surface layers of drawn glass are stronger than the surface layers of plate glass.

As an example of the lead glass composition for the sheet 1, the following is typical:

|  | Per cent |
|---|---|
| Silicon dioxide | 34.78 |
| Lead oxide | 60.35 |
| Potassium oxide | 4.52 |
| Antimony oxide | .35 |
|  | 100.00 |

Other glasses in the same class are set forth in the patent to Frederick Gelstharp No. 2,025,099 of December 25, 1935.

What I claim is:

1. In a laminated glass unit having capacity to absorb ultra-violet rays and X-rays, an intermediate glass plate readily subject to injury upon exposure to weather and having a high lead oxide content to render it relatively opaque to said rays, and a glass sheet cemented on each side of said intermediate glass plate and having a high lime soda and silica content rendering it relatively hard in texture whereby transparent protective coverings are provided on opposite faces of the intermediate glass plate.

2. In a laminated glass unit having capacity to absorb ultra-violet rays, an intermediate glass plate readily subject to injury upon exposure to weather and having high lead oxide content to render it relatively opaque to said rays, a glass sheet thinner than one-half the thickness of said glass plate and having a high lime soda and silica content rendering it relatively hard in texture, and transparent means cementing the glass sheets to the plate whereby a thin transparent protective covering is provided upon each face of the thicker intermediate glass plate.

ROBERT A. MILLER.